(12) United States Patent
Laborie-Fulchic (10) Patent No.: US 12,182,438 B2
(45) Date of Patent: Dec. 31, 2024

(54) METHOD FOR ASSISTING IN THE IDENTIFICATION OF BLANK SECTORS OF A NON-VOLATILE MEMORY OF A MICROCONTROLLER

(71) Applicant: Vitesco Technologies GmbH, Regensburg (DE)

(72) Inventor: Stéphane Laborie-Fulchic, Toulouse (FR)

(73) Assignee: VITESCO TECHNOLOGIES GBMH, Regensburg (DE)

(*) Notice: Subject to any disclaimer, the term of this patent is extended or adjusted under 35 U.S.C. 154(b) by 0 days.

(21) Appl. No.: 17/637,143

(22) PCT Filed: Oct. 8, 2020

(86) PCT No.: PCT/EP2020/078198
§ 371 (c)(1),
(2) Date: Feb. 22, 2022

(87) PCT Pub. No.: WO2021/073990
PCT Pub. Date: Apr. 22, 2021

(65) Prior Publication Data
US 2022/0283726 A1    Sep. 8, 2022

(30) Foreign Application Priority Data
Oct. 15, 2019 (FR) ........................................ 1911437

(51) Int. Cl.
*G06F 3/06* (2006.01)
(52) U.S. Cl.
CPC ............ *G06F 3/0652* (2013.01); *G06F 3/064* (2013.01); *G06F 3/0679* (2013.01); *G06F 3/0604* (2013.01)

(58) Field of Classification Search
CPC ........... G06F 2212/7202; G06F 3/0688; G06F 3/0679; G06F 3/064; G06F 3/0652;
(Continued)

(56) References Cited

U.S. PATENT DOCUMENTS

| 6,222,779 | B1* | 4/2001 | Saito | G11C 16/12 |
| | | | | 365/189.09 |
| 6,725,321 | B1* | 4/2004 | Sinclair | G06F 3/064 |
| | | | | 365/185.29 |

(Continued)

FOREIGN PATENT DOCUMENTS

TW    201015565 A    4/2010

OTHER PUBLICATIONS

"Computer Hardware: Lecture Notes", BTEC National for IT Practitioners, as preserved by the Internet Archive on Apr. 26, 2018, pp. 1-6 https://web.archive.org/web/20180426183934/http://www.folder101.com/Control/Notes/BitMasking/BitMasking.htm (Year: 2018).*

(Continued)

*Primary Examiner* — Curtis James Kortman
(74) *Attorney, Agent, or Firm* — Buchanan Ingersoll & Rooney PC (57) ABSTRACT

A method for helping to identify blank sectors of a non-volatile memory of a microcontroller is disclosed; the method includes, each time a command to write or to erase a certain sector of the matrix of memory cells of a non-volatile memory is received, in writing, to a certain memory cell of a register of the microcontroller, which memory cell is associated with the certain sector, information representative of the fact that the sector has been written or erased, that is to say of the fact that the sector in question is written or blank.

8 Claims, 3 Drawing Sheets

(58) Field of Classification Search
CPC ............... G06F 3/0604; G06F 12/0246; G06F 2009/45583; G06F 2212/7205; G06F 2212/1016; G06F 2212/7207; Y02D 10/00

See application file for complete search history.

(56) References Cited

U.S. PATENT DOCUMENTS

| | | |
|---|---|---|
| 8,103,821 B2 | 1/2012 | Chang et al. |
| 2010/0250875 A1 | 9/2010 | Leung et al. |
| 2014/0215129 A1* | 7/2014 | Kuzmin .............. G06F 12/0246 711/103 |
| 2016/0379715 A1 | 12/2016 | Pelster et al. |

OTHER PUBLICATIONS

Wikipedia, "Bit array", Jun. 14, 2018, Wikipedia, the revision preserved on Jun. 14, 2018, pp. 1-6 https://en.wikipedia.org/w/index.php?title=Bit_array&oldid=845847809 (Year: 2018).*

International Search Report and Written Opinion for International Application No. PCT/EP2020/078198, mailed Dec. 9, 2020, with partial English translation, 8 pages.

International Search Report and Written Opinion for International Application No. PCT/EP2020/078198, mailed Dec. 9, 2020, 12 pages (French).

Office Action (Examination Report) issued Sep. 10, 2024, by the Patent Office, Government of India, in corresponding India Patent Application No. 202247010085 with an English Translation of the Office Action. (8 pages).

\* cited by examiner

METHOD FOR ASSISTING IN THE IDENTIFICATION OF BLANK SECTORS OF A NON-VOLATILE MEMORY OF A MICROCONTROLLER

CROSS REFERENCE TO RELATED APPLICATIONS

This application is the U.S. National Phase Application of PCT International Application No. PCT/EP2020/078198, filed Oct. 8, 2020, which claims priority to French Patent Application No. 1911437, filed Oct. 15, 2019, the contents of such applications being incorporated by reference herein.

FIELD OF THE INVENTION

The present invention generally pertains to memories integrated into microcontrollers. It relates more particularly to identifying blank sectors of a non-volatile memory of a microcontroller. The invention is applicable, in particular, to microcontrollers equipped with a flash memory, programming memory cells of which entails checking beforehand whether they are blank.

BACKGROUND OF THE INVENTION

Generally, the term "microcontroller" denotes an integrated circuit which comprises at least one processor, memories (at least one volatile memory and at least one non-volatile memory) and input-output interfaces suitable for allowing it to be connected to other electronic circuits of the electronic system in which it is used. It is an autonomous component, which can carry out a program contained in the non-volatile memory when it is powered on, which can acquire data in digital or analog form, and which can generate and deliver digital data and/or analog electrical signals.

Microcontrollers are nowadays commonly used in all embedded electronic systems, particularly in motor vehicle applications. They allow specific functions to be performed in an environment which is subject to significant constraints on systems simultaneously in terms of size, of power consumption and of cost.

In the motor vehicle field, the majority of electronic systems with which modern motor vehicles are equipped are controlled by such microcontrollers. This is, for example, the case for systems for controlling the injection of fuel into an engine, anti-lock braking systems or indeed embedded systems for analyzing radar images in the context of more autonomous vehicles. In each of these examples, the microcontroller can perform all sorts of operations to control the relevant system.

One particular function of the non-volatile memory with which a microcontroller is equipped is to store the program which can be carried out by said microcontroller. To this end, this non-volatile memory must be able to be programmed and, where applicable, reprogrammed, according to the specific use which is made of the microcontroller in the system within which it is embedded. Programming the non-volatile memory of a microcontroller targets an operation by means of which specific data (which correspond to a program) are written to the non-volatile memory from a dedicated interface of said non-volatile memory. The term "write operation" is used when the data are useful data to be retained in the memory, in the form of binary values "0" and "1", so as to give rise to subsequent read operations according to the needs of the application. Erasing all or some of the memory is also a programming operation, of a particular type since it consists in writing "0"s or "1"s, according to the type of technology used, to all the memory cells which are erased.

Now, for some non-volatile memory technologies commonly employed in current microcontrollers, particularly flash memory technology, writing any information to the memory entails that the memory space into which the information is to be written is a blank memory space. Within the meaning of the present description, a blank memory space is a memory space which contains no already written useful data (user information) at the moment when the write process is performed. In other words, either the memory space contains, at the moment when the write process is launched, no useful information and it is then possible to write certain information directly to it, or it already contains written information and the latter must first be erased before it is possible to write new information. A write operation therefore comprises an operation of checking the state, blank or otherwise, of the memory cells which are affected by the operation.

Further, in a non-volatile memory such as those used in microcontrollers, such as, for example, in a flash memory, the data are stored in a matrix of memory cells which is sectorized. A sector (also called a block of memory cells or a memory block) is a set of memory cells of the matrix which are necessarily erased together when an erase operation is performed. Put differently, any erase operation, in particular, involves erasing all the memory cells of a certain sector. In some cases, in contrast, a write operation can involve only a single memory cell. Nevertheless, a write operation can obviously also involve a plurality of memory cells simultaneously, and do so whichever sector or sectors they belong to.

In the case of a sectorized non-volatile memory, however, reasons connected with the technology, as already mentioned above, dictate that, for data to be written to any sector whatsoever, all the memory cells of the sector in question be blank as originally, or indeed have been erased if they had previously already been written. In both cases, the sector is blank and can, on command, be wholly or partly written. This is why managing, by means of a microcontroller, the storage of data in such a non-volatile memory involves it being possible to regularly identify the blank sectors of said non-volatile memory.

The process of identifying the blank sectors of a non-volatile memory as known until now is long and laborious. Specifically, according to a first known approach, this process involves, on the one hand, using a user code (user software) designed, when it is carried out, to perform consecutive operations of reading all the memory cells of the matrix of a non-volatile memory, and on the other hand interpreting the result of this read. In this case, a specific user code, suitable for the technology of each given microcontroller, must be developed to perform these operations. Further, such a code involves risks of bugs and/or configuration difficulties.

A second known approach rests on the fact that such a non-volatile memory is managed by a control module integrated into said memory, which comprises an interface module. Besides the fact that the interface module fulfills the basic control functions for the memory, such as writing, reading or erasing, it can also fulfill a function referred to as the function of checking the state of the memory cells of erased sectors, called "verifying the erased logical sector range" in the literature. This function can be called by the user code to check the state, blank or otherwise, of the memory cells of the various sectors of a matrix of memory cells of a non-volatile memory.

In any case, with the first as with the second approach, all the memory cells of a non-volatile memory must be scanned (i.e. read or checked) in order to determine which are the blank sectors among all the sectors of a matrix of memory cells. Consequently, the operations required to identify the blank sectors of a non-volatile memory prove to be particularly long and resource-intensive, since they involve checking the state, blank or otherwise, of each memory cell of the sector. Further, the total storage capacity of a given memory or the particular division of the sectors of a given memory (i.e. their number and their size) can also contribute to prolonging the time needed to identify the blank sectors.

SUMMARY OF THE INVENTION

An aspect of the invention aims to alleviate the aforementioned drawbacks of the prior art by providing a method which makes it possible to simply and quickly write, to a register of a microcontroller, information allowing the state, blank or otherwise, of various sectors of a matrix of memory cells of a non-volatile memory of said microcontroller to be known. In particular, an aspect of the invention starts from the observation made by the inventors that a memory cell (i.e. a bit) of the register can be associated with each sector of the non-volatile memory so as to reflect the state of the sector, that is to say the fact that it is written or erased. In addition, advantageously, writing to the register can be concurrent with each operation of writing or erasing a sector. Thus, an aspect of the invention therefore intrinsically comprises dynamically updating the register so as to reflect the actual state, blank or otherwise, of the sectors at a given instant. Lastly, reading the register so as to identify the blank sectors of a matrix of memory cells of a non-volatile memory is a much faster operation than the processes for performing such an identification according to the known approaches which were presented and discussed above.

To this end, a first aspect of the invention provides a method for managing a non-volatile and rewritable memory of a microcontroller, said memory comprising a matrix of memory cells which is organized into a plurality of sectors each comprising a plurality of memory cells, and further comprising a control module suitable for managing said matrix of memory cells being and comprising an interface module configured to receive commands to write, read or erase data to or from the memory, to interpret said received commands and to perform operations corresponding to said received commands on certain memory cells of the non-volatile memory, said method comprising the following steps, carried out by the interface module in response to receiving a command to write data to at least one memory cell of a certain sector of the matrix of memory cells, or a command to erase said certain sector:

performing the write operation or the erase operation corresponding to the write command or to the erase command, respectively, on the one hand; and writing, to a memory cell of a register of the microcontroller, which is associated with the certain sector, information representative of the non-blank state or of the blank state, respectively, of the memory cells of said certain sector, on the other hand.

Some implementations taken individually or in combination further anticipate that:

the non-volatile memory further comprises a plurality of memory banks, each memory bank comprising a local matrix of memory cells and a local control module which is configured to receive commands from the control module of the non-volatile memory and to perform, on certain memory cells of the memory bank, operations associated with said received commands;

the method further comprises, in response to the interface module receiving a request to detect the blank sectors of the matrix of memory cells:

reading, from the register of the microcontroller, the information representative of the blank state or of the non-blank state of the memory cells of the sectors of the matrix of memory cells; and/or the method comprises reading the memory cells of the register of the microcontroller which are respectively associated with the sectors of the memory, using a binary mask.

In a second aspect, another subject of the invention is a non-volatile memory suitable for storing data which can be written, read and erased by a processor of a microcontroller, said non-volatile memory comprising a matrix of memory cells and a control module, said matrix of memory cells being organized into a plurality of sectors each comprising a plurality of memory cells, said control module comprising an interface module suitable for implementing all the steps of the method according to the first aspect.

Some embodiments taken individually or in combination also anticipate that:

the non-volatile memory is a memory of flash type; and/or the interface module of the control module of the non-volatile memory is a module of flash standard interface (FSI) type.

In a third aspect, another subject of the invention is a microcontroller comprising a processor, at least one input/output interface and a non-volatile memory which is suitable for storing data and exchanging data with the processor via a computer bus, said non-volatile memory comprising a matrix of memory cells and a control module, said matrix of memory cells comprising a plurality of sectors respectively composed of a plurality of memory cells, said control module comprising an interface module suitable for implementing all the steps of the method according to the first aspect.

BRIEF DESCRIPTION OF THE DRAWINGS

Other features and advantages of aspects of the invention will become more apparent on reading the description which follows. This description is purely illustrative and must be read with reference to the attached drawings, in which.

DETAILED DESCRIPTION OF THE PREFERRED EMBODIMENTS

In the description of embodiments which follows and in the figures of the attached drawings, the same elements or similar elements bear the same reference numbers in the drawings.

Although the applications of aspects of the invention are not limited to this type of memory, embodiments will be described in the context of the application to a flash memory. Flash memory is a rewritable semiconductor mass memory, that is to say a memory possessing the features of a random-access memory but which, unlike a random-access memory, is suitable for retaining the recorded data even when it is no longer supplied with power. From the functional point of view, a flash memory stores, in memory cells, the bits of data which are retained when the power supply is interrupted.

From the point of view of technology, a flash memory is based on EEPROM (electrically erasable programmable read-only memory) chips. As its basic cell it uses a MOS transistor possessing a floating gate buried in the gate oxide, between the channel and the gate, and the information is stored in a non-volatile manner by virtue of electrons being trapped in this floating gate. Data are written to and erased from a flash memory (the term "programming" is used) by applying various voltages at the input points of the cell, these voltages being higher than the voltages needed for a simple read operation. A flash memory is therefore a particular type of EEPROM. Data are generally erased and written in blocks. Lastly, data need to be erased before new data can be written.

Figure 1:
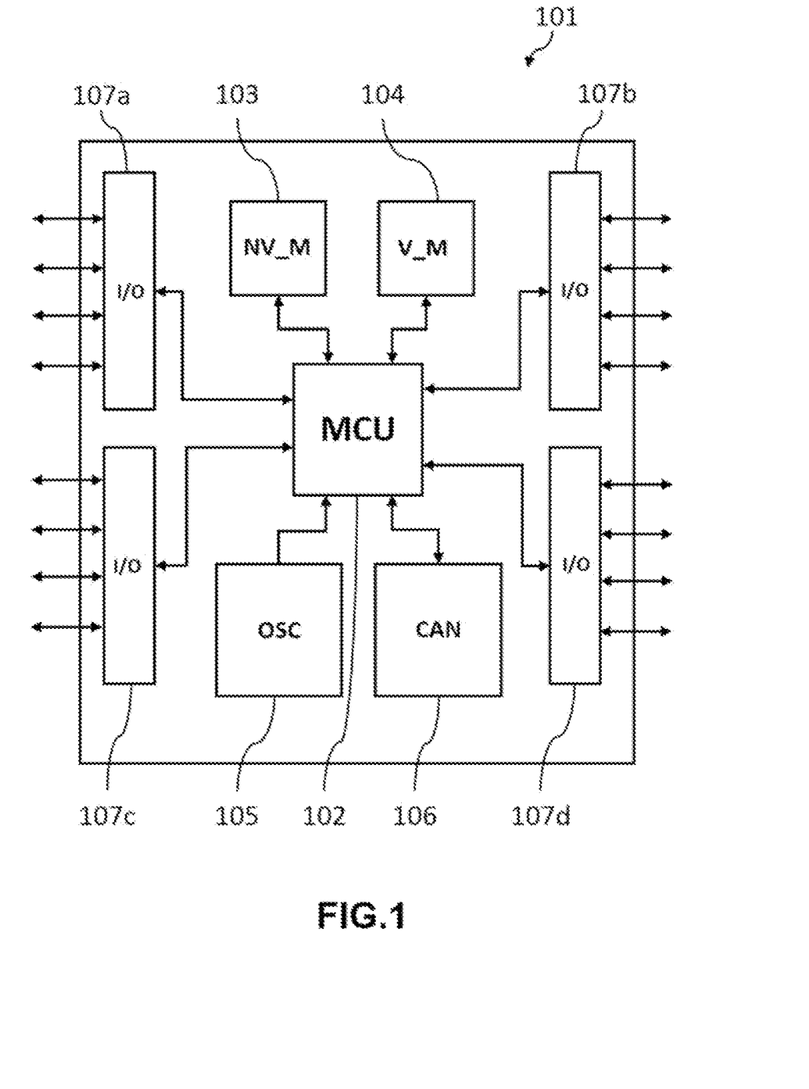
FIG. 1 is a schematic representation of a microcontroller according to one embodiment of the invention.

FIG. 1 shows an example of a microcontroller which comprises a non-volatile memory to which the method according to an aspect of the invention can be applied.

The microcontroller 101 comprises a processor 102, a non-volatile memory 103, a volatile memory 104, an oscillator 105 and input/output interfaces 107a, 107b, 107c and 107d. Further, the microcontroller also comprises one or more peripheral components 106 such as, for example, an analogue-to-digital converter or a bus controller. Specifically, the various components of the microcontroller exchange data in the form of binary signals via a computer bus which connects them, but can also receive and/or generate analogue electrical signals from sensors and/or intended for circuits to be controlled. As has already been mentioned above, such a microcontroller can be integrated into any embedded electronic system, for which it then acts as a control unit for managing a certain function.

It will be recalled, as is known per se, that the processor 102 can carry out a user program which is stored in the non-volatile memory 103 of the microcontroller 101. The volatile memory 104 is, for its part, used to store data and variables which are useful to the operation of the microcontroller but which are lost when the latter is no longer supplied with power. The oscillator 105 is used to clock all the operations performed by the components of the microcontroller. It can be, for example, an RC circuit. Lastly, the input/output interfaces, as their name indicates, can be connected to other electronic components or circuits of an embedded system with which the microcontroller interacts.

Figure 2:
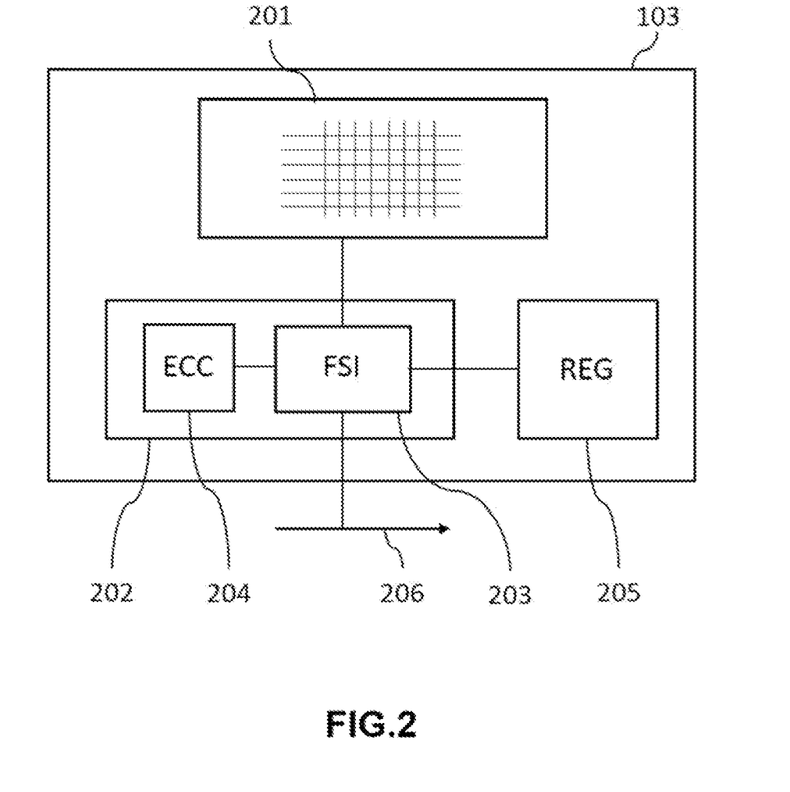
FIG. 2 is a schematic representation of a non-volatile memory according to one embodiment of the invention.

With reference to FIG. 2, one embodiment of a non-volatile and rewritable memory to which the method according to the invention can be applied will now be described in more detail. As previously indicated, the memory under consideration here is a memory of flash type, but a person skilled in the art will appreciate that the invention is not limited to this type of memory.

Advantageously, a flash memory offers a high access speed, a long lifetime and low electricity consumption. This is why it is used extensively, particularly in microcontrollers used in motor vehicle applications.

The non-volatile and rewritable memory 103 comprises a matrix 201 of memory cells (an array) and a control module 202. The matrix 201 of memory cells comprises a plurality of sectors each composed of a plurality of memory cells. It will be recalled that a memory cell is the fundamental unit for storing data in a memory. In particular, each memory cell stores a binary information bit in the form of a "0" or of a "1". A person skilled in the art will appreciate that the method according to an aspect of the invention is applicable to a non-volatile memory whatever the size (i.e. the total storage space) of said memory, the number of sectors which its matrix of memory cells comprises or the respective sizes of its various sectors.

The control module 202 manages access to and the operation of the memory as a whole. More specifically, the control module 202 comprises an interface module 203 which is configured to receive commands, for example via the computer bus 206 of the microcontroller, to interpret said commands and to perform, on certain memory cells of the non-volatile memory, certain operations which correspond to said received commands. The operations in question can be, for example, operations of writing, reading, erasing or indeed checking memory cells of the matrix. What is meant by "checking" is, more specifically, checking the state, blank or otherwise, of the memory cells of the memory. Further, in one particular embodiment, the interface module 203 can also interact with a code error correction module 204 which allows the errors connected with the possible corruption of data contained in the memory to be corrected. Lastly, the interface module 203 also accesses a state register 205 (or flag register) of the microcontroller in which it can write and erase memory cells. The state register 205 is a dedicated portion of the non-volatile memory which is not integrated into the matrix 201 of memory cells. As is known per se, the state register is therefore a very quickly accessible memory used, inter alia, to store information in relation to the state of the non-volatile memory or with the operations performed on said non-volatile memory. Of course, the microcontroller can comprise other state registers (which are not shown) like the register 205, which are suitable for being used in the context of managing other functionalities of the microcontroller.

Figure 3:
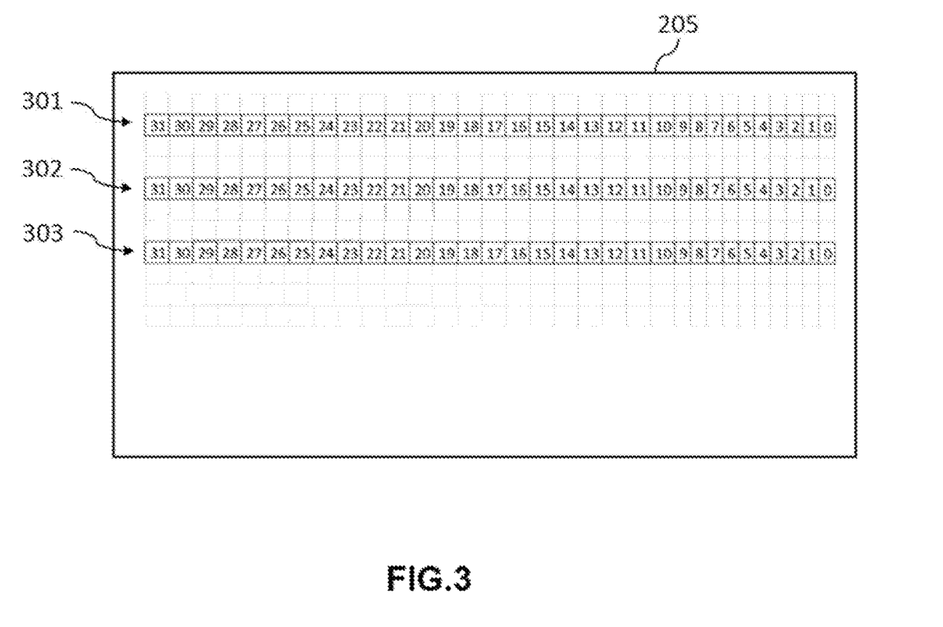
FIG. 3 is a schematic representation of a register of a microcontroller according to one embodiment of the invention.

FIG. 3 shows a schematic representation of a state register 205 of a microcontroller according to one embodiment of the invention. More particularly, FIG. 3 shows a state register 205 with three subsets 301, 302 and 303 of memory cells of 32 bits each, which are respectively used to store specific information in relation, for example, to identifying the non-volatile memory or with the status of the non-volatile memory. The method according to an aspect of the invention, as will be described below, consists in using some of these memory cells of the state register 205 to store information which reflects the state of certain sectors of the matrix of memory cells of the non-volatile memory. The state of a certain sector can be blank (that is to say that the sector has never had data written to it, or indeed that data which had been written to it have subsequently been erased by an erase operation) or non-blank (that is to say that useful data have been written to the sector and are still stored there). In other words, the state of a certain bit of the state register is directly associated with the state, blank or otherwise, of the memory cells of a certain sector. In particular, depending on whether the value of the bit in question is 0 or 1, the corresponding certain sector is blank or written, or vice versa.

Returning to FIG. 2, a person skilled in the art will appreciate that, in one particular embodiment, a non-volatile memory can comprise a plurality of memory banks. Each memory bank can be accessed in the same way by the processor of the microcontroller via a computer bus and integrates elements which are substantially identical to those contained in a non-volatile memory as was described above with reference to FIG. 2. In particular, each memory bank comprises a local matrix of memory cells and a local control module which is configured to receive commands from the control module of the non-volatile memory and to perform, on certain memory cells of the memory bank, operations associated with said received commands. Advantageously, each operation of managing data in the memory can be performed in parallel on a plurality of memory banks of a single non-volatile memory. Further, in such a configuration, the instructions/commands from the bus are first received and interpreted by a single control module of the non-volatile memory which passes them on to the local control modules, specific to each bank, which are in charge of carrying out the associated commands.

Figure 4:
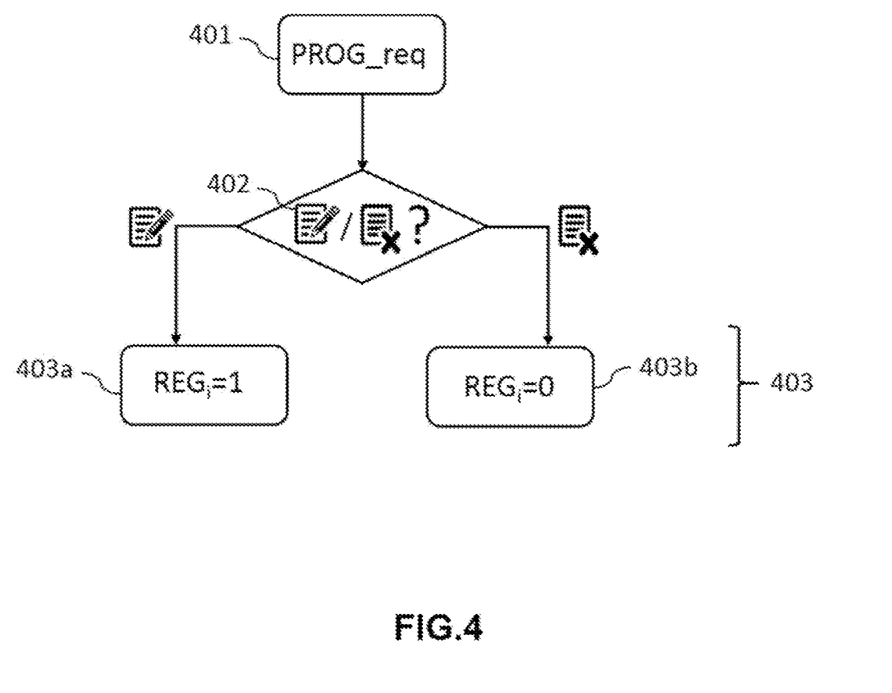
FIG. 4 is a diagram of steps of one implementation of the method according to an aspect of the invention.

With reference to FIG. 4, one implementation of the method according to an aspect of the invention will now be described. The method can be carried out by the interface module of the control module of the non-volatile memory.

Step 401 consists in receiving a command PROG_req to program in the memory, which can be a command to write data to at least one memory cell of a certain sector of the matrix of memory cells or a command to erase a certain sector of the matrix of memory cells. Specifically, it will be recalled that the erase operation can bear only on an entire sector whereas the write operation can bear on only part of a sector, where applicable. Typically, the write resolution, that is to say the minimum number of memory cells which can be written simultaneously during a write operation, is 8 bytes. The term "page" is used to denote such a group of bytes forming a subdivision of a sector of the memory.

The block 402 of the diagram of steps illustrates the choice made by the interface module in response to receiving the programming command PROG_req in step 401, depending on whether the command received in said step is a write or erase command. The first case leads to step 403a of the method being performed and the second to step 403b of the method being performed. A person skilled in the art will appreciate that, whatever the chosen case, step 403 is performed concurrently with the commanded write or read operation being performed. In particular, it is this aspect which allows the state register 205 of the microcontroller to be dynamically updated and, consequently, the blank or non-blank state of the various sectors of the matrix of memory cells of the non-volatile memory to be monitored over time.

Thus, in the first case, step 403a consists in writing, to a certain memory cell REGi of the state register 205 of the microcontroller, which memory cell is associated with the sector thus written, information representative of said certain sector being written (namely the logical value "1" in the example shown). Put differently, at the same time as the interface module actually writes all or some of a certain sector, it also writes a certain bit REGi of the state register 205, which is specifically associated with this sector, so that this bit represents the written state of said sector.

In the second case, step 403b consists in writing, to the certain memory cell REGi of the state register 205 of the microcontroller, which memory cell is associated with the sector thus erased, information representative of said certain sector being erased (namely the logical value "0" in the example shown). The information reflects the fact that the sector in question is therefore blank, that is to say the fact that all its memory cells are in the blank state. Put differently, when the interface module actually erases the whole of a certain sector, it also writes a certain bit REGi of the state register 205, which corresponds specifically to this sector, so that this bit represents the blank state of said sector.

In one particular implementation of the method, the method further comprises, in response to the interface module receiving a request to detect the blank sectors of the matrix of memory cells, reading the register of the microcontroller and transmitting information representative of the sectors of the matrix of memory cells being written or erased. These steps allow the various blank sectors of a non-volatile memory to be identified reliably at a given instant. Particularly with a view to programming memory cells of said non-volatile memory.

Advantageously, the method therefore makes it possible to write the information relating to the state of the sectors in a very quickly accessible memory and to update this information each time the state of the sectors changes. Identifying the blank sectors is, as a result, much less resource-intensive, particularly less time-consuming, than the approaches known until now.

Further, in one particular implementation of the method, reading each memory cell of the register of the microcontroller is respectively associated with the sectors of the memory, using a binary mask. As is known per se, such a binary mask is a binary sequence intended to indicate the position of the bits which are affected by a certain operation. A certain logical operation, applied to the combination of the mask and of the cells of the register, allows only the cells of interest to be targeted. Thus, the operation of reading the register of the microcontroller bears only on a certain portion of the memory cells of said register which are considered useful so as to further reduce the duration of the operation.

In one particular embodiment of the non-volatile memory, the interface module of the control module of the non-volatile memory can be a module of flash standard interface (FSI) type, generally present in memories of flash type. Advantageously, such an interface module is a module commonly used to receive, interpret and carry out the commands from the bus of the microcontroller and therefore does not require anything specific to implement the method in a microcontroller.

In the claims, the term "comprise" does not exclude other elements or other steps. A single processor or a plurality of other units can be used to implement an aspect of the invention. The various presented and/or claimed features can advantageously be combined. Their presence in the description or in different dependent claims does not exclude this possibility. The reference signs should not be understood as limiting the scope of the invention.

The invention claimed is:

1. A method for managing a non-volatile, rewritable memory of a microcontroller, said non-volatile memory comprising a matrix of memory cells organized into a plurality of sectors each comprising a plurality of memory cells; and a controller configured to manage said matrix of memory cells, wherein the controller comprises an interface configured to receive commands to: (a) write, read, or erase data to or from the non-volatile memory, and (b) interpret said received commands and perform operations corresponding to said received commands on certain memory cells of the non-volatile memory, wherein said method is carried out by the interface, said method comprising:

receiving, by the interface, a command to write data to at least one memory cell of a certain sector of the matrix of memory cells, or a command to erase said certain sector;

performing, by the interface, a write operation or an erase operation corresponding to the command to write data to the at least one memory cell of the certain sector or to the command to erase said certain sector, respectively;

associating, by the interface, a certain memory cell of a register of the microcontroller with the certain sector of the plurality of sectors, wherein the register of the microcontroller is a dedicated portion of the non-volatile memory that is not integrated into the matrix of memory cells and wherein the certain memory cell of the register of the microcontroller is a single bit of the register of the microcontroller associated with a respective sector of the plurality of sectors;

writing, by the interface, information representative of a non-blank state or blank state, respectively, of the memory cells of the certain sector, to the certain memory cell of the register of the microcontroller, wherein the writing information representative of the non-blank state or blank state, respectively, of the memory cells of the certain sector, to the certain memory cell of the register of the microcontroller is performed at the same time as performing the write operation or the erase operation; and reading, by the interface, corresponding certain memory cells of the register of the microcontroller which are respectively associated with the plurality of sectors of the memory, using a binary mask, wherein the reading corresponding certain memory cells of the register of the microcontroller comprises reading in combination with using the binary mask, the certain memory cell of the register of the microcontroller that is associated with the respective sector of the plurality of sectors.

2. The method as claimed in claim 1, wherein the non-volatile memory further comprises a plurality of memory banks, each memory bank comprising a local matrix of memory cells and a local controller configured to receive commands from the controller of the non-volatile memory and to perform, on certain memory cells of the memory bank, operations associated with said received commands.

3. The method as claimed in claim 1, further comprising, in response to the interface receiving a request to detect blank sectors of the matrix of memory cells:

reading, from the register of the microcontroller, the information representative of a blank state or of the non-blank state of the memory cells of the sectors of the matrix of memory cells.

4. The method as claimed in claim 1, wherein the reading corresponding certain memory cells of the register of the microcontroller comprises targeting the certain memory cell of the register of the microcontroller that includes information representative of the non-blank state or blank state, respectively, of the memory cells of the certain sector.

5. A non-volatile memory configured to store data which can be written, read, and erased by a processor of a microcontroller, said non-volatile memory comprising a matrix of memory cells and a controller, said matrix of memory cells being organized into a plurality of sectors each comprising a plurality of memory cells, and said controller comprising an interface configured to:

receive a command to write data to at least one memory cell of a certain sector of the matrix of memory cells, or a command to erase said certain sector;

perform a write operation or an erase operation corresponding to the command to write data to the at least one memory cell of the certain sector or to the command to erase said certain sector, respectively;

associate a certain memory cell of a register of the microcontroller with the certain sector of the plurality of sectors, wherein the register of the microcontroller is a dedicated portion of the non-volatile memory that is not integrated into the matrix of memory cells and wherein the certain memory cell of the register of the microcontroller is a single bit of the register of the microcontroller associated with a respective sector of the plurality of sectors;

write information representative of a non-blank state or blank state, respectively, of the memory cells of the certain sector, to the certain memory cell of the register of the microcontroller, wherein the writing information representative of the non-blank state or blank state, respectively, of the memory cells of the certain sector, to the certain memory cell of the register of the microcontroller is performed at the same time as performing the write operation or the erase operation; and read corresponding certain memory cells of the register of the microcontroller which are respectively associated with the plurality of sectors of the memory, using a binary mask, wherein reading the corresponding certain memory cells of the register of the microcontroller comprises reading in combination with using the binary mask, the certain memory cell of the register of the microcontroller that is associated with the respective sector of the plurality of sectors.

6. The non-volatile memory as claimed in claim 5, wherein said non-volatile memory is a flash memory.

7. The non-volatile memory as claimed in claim 5, wherein the interface of the controller of the non-volatile memory is compatible with a flash standard interface (FSI).

8. A microcontroller comprising a processor, at least one input/output interface and a non-volatile memory configured to store data and exchange data with the processor via a computer bus, said non-volatile memory comprising a matrix of memory cells and a controller, said matrix of memory cells comprising a plurality of sectors respectively composed of a plurality of memory cells, and said controller comprising an interface configured to:

receive a command to write data to at least one memory cell of a certain sector of the matrix of memory cells, or a command to erase said certain sector;

perform a write operation or an erase operation corresponding to the command to write data to the at least one memory cell of the certain sector or to the command to erase said certain sector, respectively;

associate a certain memory cell of a register of the microcontroller with the certain sector of the plurality of sectors, wherein the register of the microcontroller is a dedicated portion of the non-volatile memory that is not integrated into the matrix of memory cells and wherein the certain memory cell of the register of the microcontroller is a single bit of the register of the microcontroller associated with a respective sector of the plurality of sectors;

write information representative of a non-blank state or blank state, respectively, of the memory cells of the certain sector, to the certain memory cell of the register of the microcontroller, wherein the writing information representative of the non-blank state or blank state, respectively, of the memory cells of the certain sector, to the certain memory cell of the register of the microcontroller is performed at the same time as performing the write operation or the erase operation; and read corresponding certain memory cells of the register of the microcontroller which are respectively associated with the plurality of sectors of the memory, using a binary mask, wherein reading the corresponding certain memory cells of the register of the microcontroller comprises reading in combination with using the binary mask, the certain memory cell of the register of the microcontroller that is associated with the respective sector of the plurality of sectors.

\* \* \* \* \*

UNITED STATES PATENT AND TRADEMARK OFFICE
CERTIFICATE OF CORRECTION

| | |
|---|---|
| PATENT NO. | : 12,182,438 B2 |
| APPLICATION NO. | : 17/637143 |
| DATED | : December 24, 2024 |
| INVENTOR(S) | : Stéphane Laborie-Fulchic |

It is certified that error appears in the above-identified patent and that said Letters Patent is hereby corrected as shown below:

On the Title Page

Item (73) Assignee, Please change "VITESCO TECHNOLOGIES GBMH" to --VITESCO TECHNOLOGIES GMBH--.

Signed and Sealed this
Eighth Day of April, 2025

Coke Morgan Stewart
*Acting Director of the United States Patent and Trademark Office*